(12) United States Patent
Aoki et al.

(10) Patent No.: US 12,115,754 B2
(45) Date of Patent: Oct. 15, 2024

(54) LAYERED PRODUCT

(71) Applicant: DIC Corporation, Tokyo (JP)

(72) Inventors: Takamichi Aoki, Ichihara (JP); Tomomichi Kanda, Ichihara (JP)

(73) Assignee: DIC Corporation, Tokyo (JP)

( * ) Notice: Subject to any disclaimer, the term of this patent is extended or adjusted under 35 U.S.C. 154(b) by 0 days.

(21) Appl. No.: 17/776,157

(22) PCT Filed: Nov. 26, 2020

(86) PCT No.: PCT/JP2020/043923
§ 371 (c)(1),
(2) Date: May 11, 2022

(87) PCT Pub. No.: WO2021/106974
PCT Pub. Date: Jun. 3, 2021

(65) Prior Publication Data
US 2022/0410534 A1 Dec. 29, 2022

(30) Foreign Application Priority Data

Nov. 26, 2019 (JP) .................................. 2019-213202

(51) Int. Cl.
*B32B 15/08* (2006.01)
*B32B 3/00* (2006.01)
(Continued)

(52) U.S. Cl.
CPC ................ *B32B 15/08* (2013.01); *B32B 3/00* (2013.01); *B32B 3/30* (2013.01); *B32B 15/085* (2013.01);
(Continued)

(58) Field of Classification Search
CPC .......... B32B 2457/00; B32B 2264/104; B32B 2264/204; B32B 2264/302;
(Continued)

(56) References Cited

U.S. PATENT DOCUMENTS 5,200,271 A * 4/1993 Kosaka .................... C08K 7/10
428/457
5,891,532 A * 4/1999 Furuta ..................... C08L 67/04
428/480
(Continued)

FOREIGN PATENT DOCUMENTS

JP S63-14880 A 1/1988
JP H07-207141 A 8/1995
(Continued)

*Primary Examiner* — Michael E. La Villa
(74) *Attorney, Agent, or Firm* — Locke Lord LLP; James E. Armstrong, IV; Nicholas J. DiCeglie, Jr.

(57) ABSTRACT

Provided is a production method for a layered product in which a metal film can be formed on the surface of a polyarylene sulfide (PAS) molded article with a high adhesive force by a simple step. Further, provided are: a polyarylene sulfide resin composition and a molded article that can be used in the layered product in which a metal film can be formed on the surface of the PAS molded article with a high adhesive force by a simpler step; and production methods therefor. More specifically, provided are: a polyarylene sulfide resin composition obtained by blending a polyarylene sulfide resin, a thermoplastic elastomer and/or a hydrolyzable thermoplastic resin, a carbonate, and a polyolefin-based wax; a molded article which is obtained by melt-molding the polyarylene sulfide resin composition and in which the surface is roughened; a layered product having a metal plating layer; and production methods therefor.

4 Claims, 4 Drawing Sheets

(51) Int. Cl.
  *B32B 3/30* (2006.01)
  *B32B 15/085* (2006.01)
  *B32B 27/20* (2006.01)
  *C08G 75/0204* (2016.01)
  *C08K 3/26* (2006.01)
  *C08K 7/02* (2006.01)
  *C08K 7/14* (2006.01)
  *C08L 23/00* (2006.01)
  *C08L 77/10* (2006.01)
  *C08L 81/02* (2006.01)
  *C08L 91/06* (2006.01)
  *C08L 101/00* (2006.01)
  *C23C 18/16* (2006.01)
  *C23C 18/20* (2006.01)
  *C23C 18/24* (2006.01)
  *C23C 30/00* (2006.01)
  *C25D 5/56* (2006.01)
  *C25D 3/38* (2006.01)

(52) U.S. Cl.
  CPC .......... *B32B 27/20* (2013.01); *C08G 75/0204* (2013.01); *C08K 3/26* (2013.01); *C08K 7/02* (2013.01); *C08K 7/14* (2013.01); *C08L 23/00* (2013.01); *C08L 77/10* (2013.01); *C08L 81/02* (2013.01); *C08L 91/06* (2013.01); *C08L 101/00* (2013.01); *C23C 18/1641* (2013.01); *C23C 18/1653* (2013.01); *C23C 18/2066* (2013.01); *C23C 18/24* (2013.01); *C23C 30/00* (2013.01); *C25D 5/56* (2013.01); *B32B 2250/02* (2013.01); *B32B 2264/104* (2013.01); *B32B 2264/204* (2020.08); *B32B 2264/302* (2020.08); *B32B 2264/303* (2020.08); *B32B 2457/00* (2013.01); *C08K 2003/265* (2013.01); *C08K 2003/267* (2013.01); *C08K 2201/005* (2013.01); *C08L 2201/08* (2013.01); *C08L 2203/20* (2013.01); *C08L 2203/30* (2013.01); *C08L 2205/035* (2013.01); *C08L 2207/04* (2013.01); *C25D 3/38* (2013.01); *Y10T 428/12007* (2015.01); *Y10T 428/12451* (2015.01); *Y10T 428/12472* (2015.01); *Y10T 428/12556* (2015.01); *Y10T 428/12562* (2015.01); *Y10T 428/12569* (2015.01); *Y10T 428/12701* (2015.01); *Y10T 428/12736* (2015.01); *Y10T 428/12861* (2015.01); *Y10T 428/12868* (2015.01); *Y10T 428/12875* (2015.01); *Y10T 428/12882* (2015.01); *Y10T 428/12889* (2015.01); *Y10T 428/12896* (2015.01); *Y10T 428/12903* (2015.01); *Y10T 428/12931* (2015.01); *Y10T 428/12937* (2015.01); *Y10T 428/12944* (2015.01); *Y10T 428/12951* (2015.01)

(58) Field of Classification Search
  CPC .......... B32B 2264/303; B32B 2250/02; B32B 15/08; B32B 15/085; B32B 3/30; B32B 3/00; B32B 27/20; C08G 75/0204; C08K 3/26; C08K 7/02; C08K 7/14; C08K 2003/265; C08K 2003/267; C08K 2201/005; C08L 23/00; C08L 77/10; C08L 81/02; C08L 91/06; C08L 101/00; C08L 2201/08; C08L 2203/20; C08L 2203/30; C08L 2205/035; C08L 2207/04; C23C 18/1641; C23C 18/24; C23C 30/00; C23C 18/1653; C23C 18/2066; Y10T 428/12007; Y10T 428/12451; Y10T 428/12472; Y10T 428/12556; Y10T 428/12562; Y10T 428/12569; Y10T 428/12861; Y10T 428/12868; Y10T 428/12875; Y10T 428/12882; Y10T 428/12889; Y10T 428/12896; Y10T 428/12903; Y10T 428/12931; Y10T 428/12937; Y10T 428/12944; Y10T 428/12951; Y10T 428/12701; Y10T 428/12736; C25D 3/38; C25D 5/56
  See application file for complete search history.

(56) References Cited

U.S. PATENT DOCUMENTS

| | | |
|---|---|---|
| 2009/0118405 A1 | 5/2009 | Aizawa et al. |
| 2019/0070631 A1 | 3/2019 | Fujikawa et al. |

FOREIGN PATENT DOCUMENTS

| | | |
|---|---|---|
| JP | H10-183362 A | 7/1998 |
| JP | 2002-97292 A | 4/2002 |
| JP | 2008-007758 A | 1/2008 |
| JP | 6355008 B2 | 7/2018 |
| JP | 2019-065101 A | 4/2019 |
| WO | 2007/001036 A1 | 1/2007 |
| WO | 2017/154879 A1 | 9/2017 |

* cited by examiner

LAYERED PRODUCT

TECHNICAL FIELD

The present invention relates to a polyphenylene sulfide resin composition, a molded article, a layered product, and production methods therefor. More particularly, the invention relates to a layered product in which a metal film is easily formed on the surface of a polyphenylene sulfide resin molded article with a high adhesion force and a production method therefor, a polyarylene sulfide resin composition and a molded article for providing the layered product, and production methods therefor.

BACKGROUND ART

In recent years, in the automobile field, in order to achieve fuel economy and the like by weight reduction, in the related art, various members made of metals have been replaced with engineering plastics having a lighter weight, heat resistance, and chemical resistance. In addition, the engineering plastic having heat resistance is also attracting attention as a member of a power semiconductor that is driven at a relatively high temperature.

Among the engineering plastics, a resin composition containing a polyarylene sulfide (sometimes abbreviated as "PAS") represented by so-called polyphenylene sulfide (sometimes abbreviated as "PPS") and a molded article thereof are useful because of having excellent heat resistance and chemical resistance. However, when a metal film needs to be formed on the surface of the molded article, for example, when used for an electronic circuit, a wiring connector, or the like, since a PAS resin composition or a molded article thereof is hardly adhered (hardly adhesive), even when the surface is roughened to form the metal film, there is a problem that the metal film is likely to be peeled off.

As a method for solving the above problem, a method has been proposed in which the surface of a PAS molded article is etched with an etching solution, electroless copper plating is performed after a palladium catalyst is applied, and a copper plating layer is formed (see, for example, PTL 1). However, even in this method, there is a problem that the surface of the PAS molded article is eroded by the etching solution and is fragile, and the copper plating layer formed thereon is likely to be peeled off over time. Therefore, when a conductive pattern is formed by this method, there is a problem that disconnection of the copper plating layer and a decrease in conductivity (increase in resistance value) occur.

In addition, a method has been proposed in which the surface of a PAS molded article is roughened by sandblasting, shot blasting, or the like, a primer resin is applied, and an adhesive force with film is improved by a metal vapor deposition, metal plating or the like (see PTL 2). However, in order to ensure a sufficient adhesive force, the surface of polyphenylene sulfide is roughened to a depth of 1 µm to 10 µm, and thus polyphenylene sulfide is not suitable for materials for, for example, lamp reflectors that require surface smoothness of a mirror surface or the like.

Therefore, there is a demand for a layered product in which the metal film is formed on the surface of the PAS molded article with a high adhesive force. Therefore, it has been proposed that in a method in which a primer resin layer and a metal layer containing metal particles are formed on the surface of a PAS molded article by an immersion method, and then a metal plating layer is formed by an electrolytic plating method, an electroless plating method, or the like, when a metal film is to be formed on the surface of polyphenylene sulfide, the metal film can be easily formed on the surface of polyphenylene sulfide with a high adhesive force (see PTLs 3 and 4). However, since this method is a method of sequentially forming the primer resin layer, the metal layer containing metal particles, and the metal plating layer on the surface of the PAS molded article, and includes many steps, it has been desired to propose a method with fewer steps from the viewpoint of productivity.

CITATION LIST

Patent Literature

PTL 1: JP-A-S63-14880
PTL 2: JP-A-2002-97292
PTL 3: WO 2017/154879
PTL 4: Japanese Patent No. 6355008

SUMMARY OF INVENTION

Technical Problem

An object of the invention is to provide a layered product in which a metal film can be formed on the surface of a PAS molded article with a high adhesive force by a simple step, and a production method therefor. Another object of the invention is to provide a polyarylene sulfide resin composition and a molded article that can be used in such a layered product and used in the production method therefor, and production methods therefor.

Solution to Problem

As a result of intensive studies to solve the above problems, the present inventors have found that when a molded article obtained by melt-molding a polyarylene sulfide resin composition obtained by blending a polyarylene sulfide resin (A), a thermoplastic resin (B) other than a polyarylene sulfide resin selected from the group consisting of a thermoplastic elastomer (b1) and a hydrolyzable thermoplastic resin (b2), a carbonate (C), and a polyolefin-based wax (D) is roughened by a chemical etching treatment, a metal film formed by a metal plating treatment method exhibits a high adhesive force on the roughened surface, and thus the invention has been completed.

That is, the invention relates to a production method for a layered product, and the production method includes a step of roughening, by a chemical etching treatment, the surface of a molded article obtained by molding a polyarylene sulfide resin composition, and a step of performing a metal plating treatment on the roughened surface of the molded article. The polyarylene sulfide resin composition is obtained by blending a polyarylene sulfide resin (A), a thermoplastic resin (B) other than a polyarylene sulfide resin selected from the group consisting of a thermoplastic elastomer (b1) and a hydrolyzable thermoplastic resin (b2), a carbonate (C), and a polyolefin-based wax (D).

In addition, the invention relates to a layered product in which a metal layer is layered on a roughened surface of a molded article obtained by molding a polyarylene sulfide resin composition.

The polyarylene sulfide resin composition is obtained by blending a polyarylene sulfide resin (A), a thermoplastic resin (B) other than a polyarylene sulfide resin selected from the group consisting of a thermoplastic elastomer (b1) and a hydrolyzable thermoplastic resin (b2), a carbonate (C), and a polyolefin-based wax (D).

In addition, the invention relates to a production method for a polyarylene sulfide resin composition, and the production method includes a step of blending and melt-kneading a polyarylene sulfide resin (A), a thermoplastic resin (B) other than a polyarylene sulfide resin selected from the group consisting of a thermoplastic elastomer (b1) and a hydrolyzable thermoplastic resin (b2), a carbonate (C), and a polyolefin-based wax (D).

In addition, the invention relates to a production method for a molded article, and the production method includes a step of melt-molding a polyarylene sulfide resin composition produced by the production method for a polyarylene sulfide resin composition described above.

In addition, the invention relates to a polyarylene sulfide resin composition obtained by blending a polyarylene sulfide resin (A), a thermoplastic resin (B) other than a polyarylene sulfide resin selected from the group consisting of a thermoplastic elastomer (b1) and a hydrolyzable thermoplastic resin (b2), a carbonate (C), and a polyolefin-based wax (D).

In addition, the invention relates to a molded article obtained by melt-molding the polyarylene sulfide resin composition described above.

In the invention, joining of the surface of the PAS molded article to the metal film is expressed as adhesion.

ADVANTAGEOUS EFFECTS OF INVENTION

According to the invention, it is possible to provide a layered product in which a metal film can be formed on the surface of a PAS molded article with a high adhesive force by a simpler step, and a production method therefor. Further, it is possible to provide a polyarylene sulfide resin composition and a molded article that can be used in such a layered product and used in the production method therefor, and production methods therefor.

DESCRIPTION OF EMBODIMENTS

Figure 1:
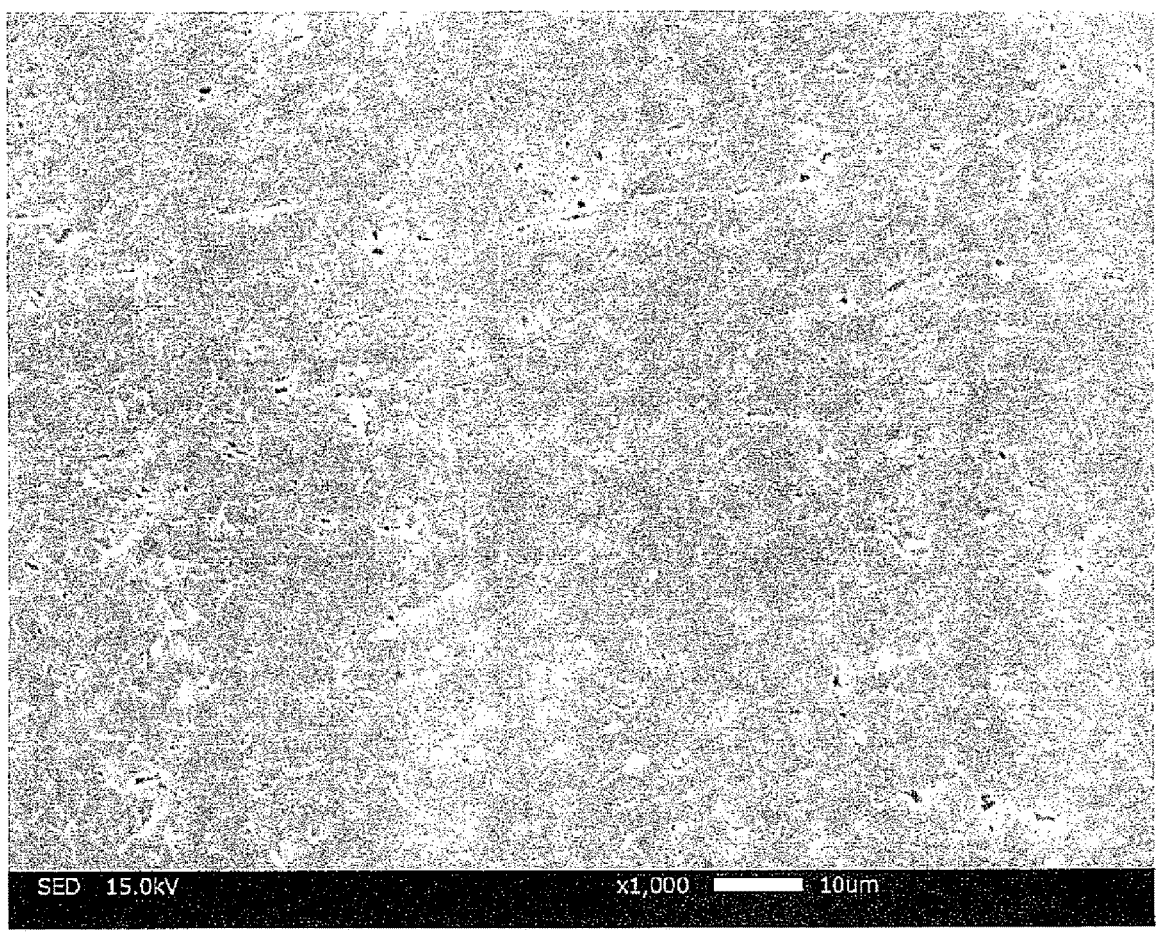
FIG. 1 is an SEM photograph of a PAS molded article produced in Example 3 before the surface is roughened.
Figure 2:
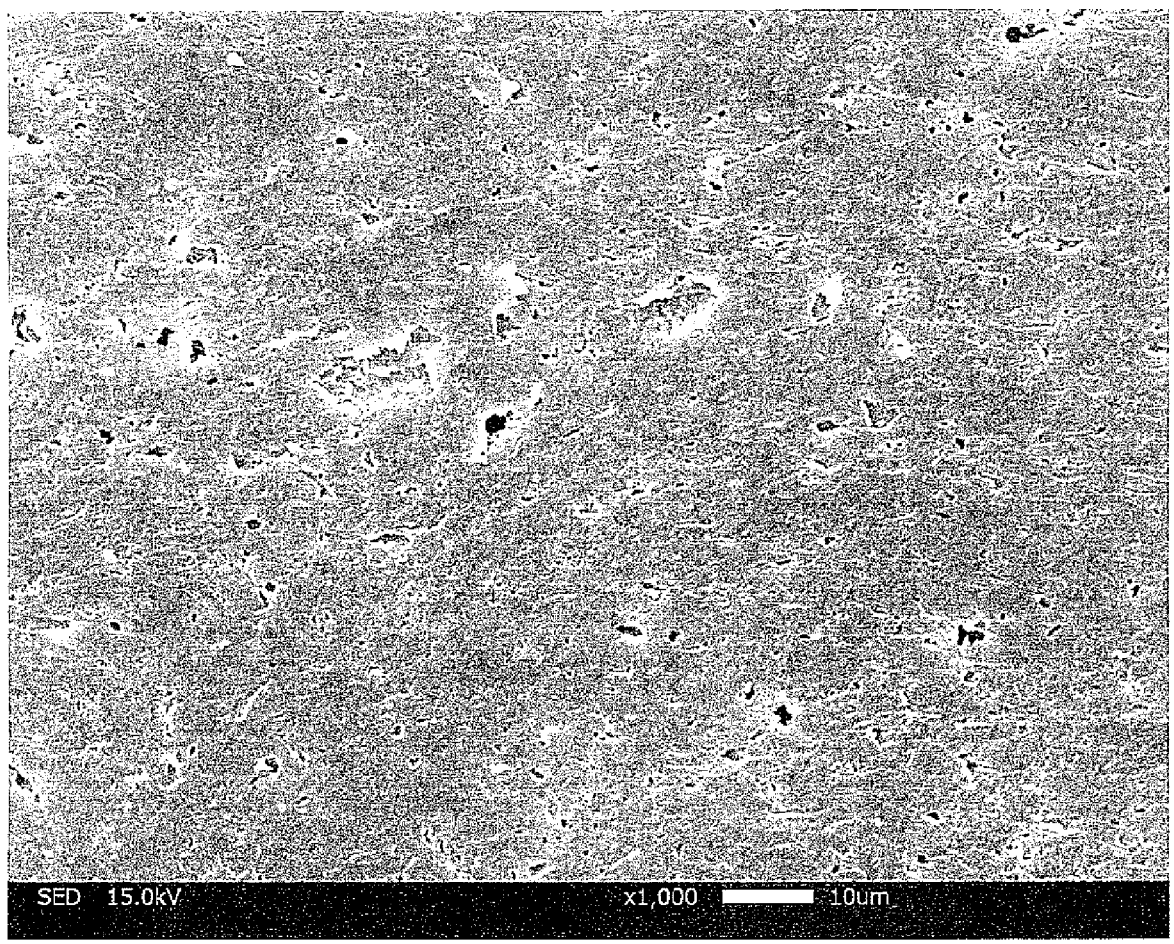
FIG. 2 is an SEM photograph of the PAS molded article produced in Example 3 after the surface is roughened.
Figure 3:
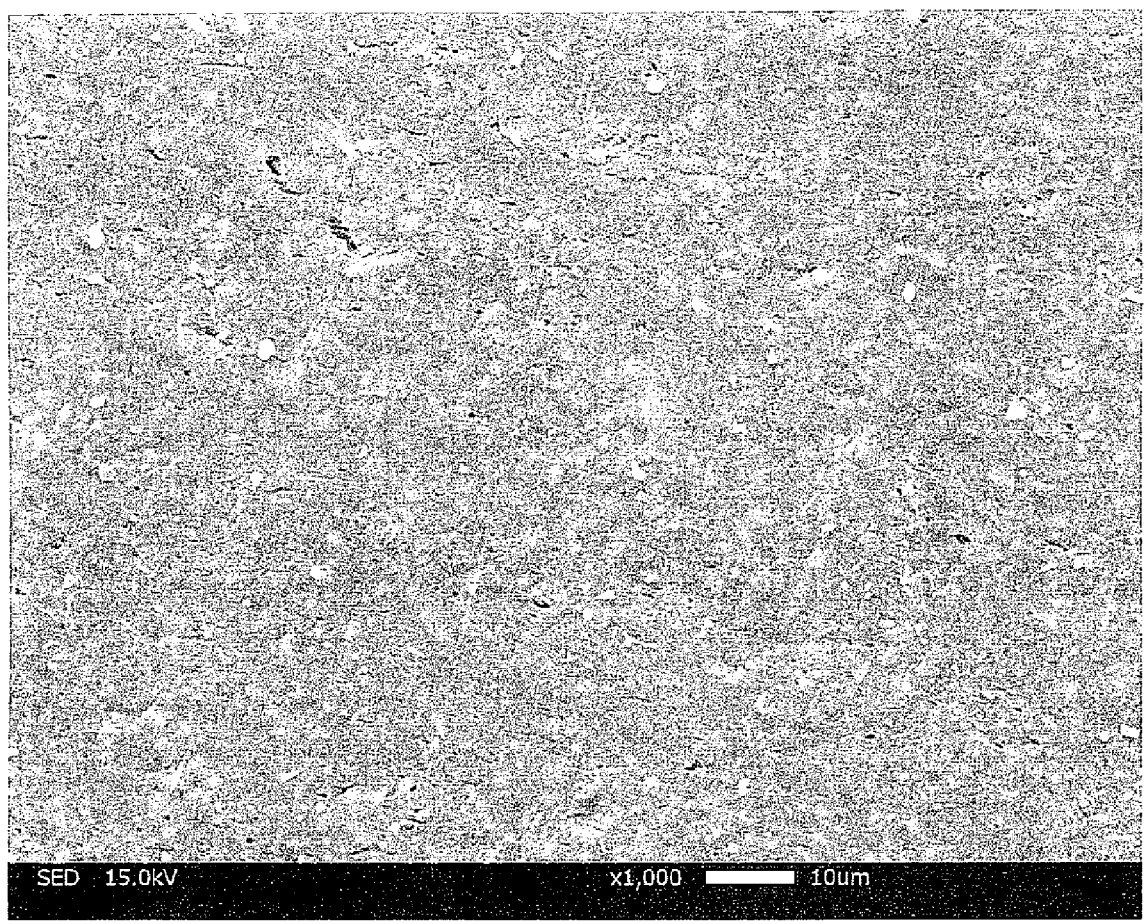
FIG. 3 is an SEM photograph of a PAS molded article produced in Comparative Example 4 before the surface is roughened.
Figure 4:
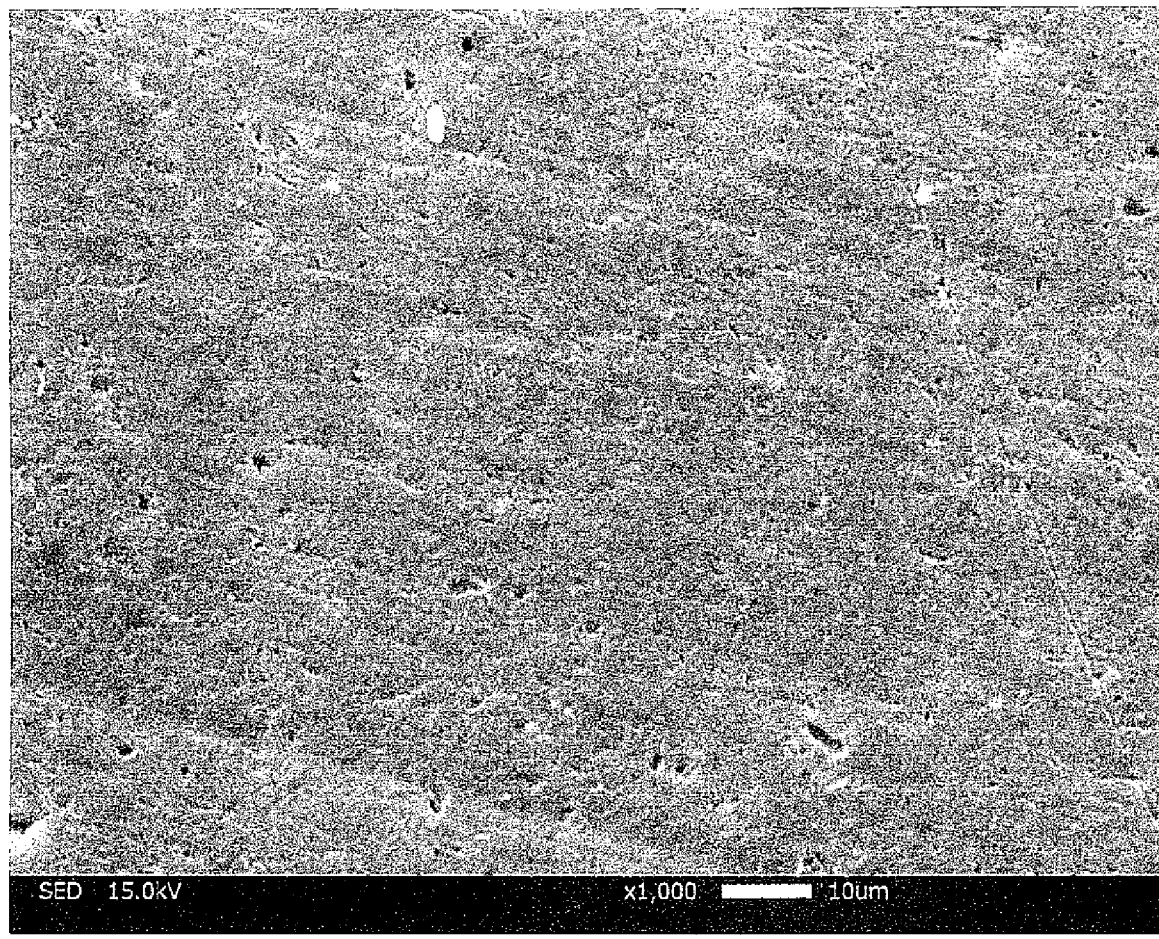
FIG. 4 is an SEM photograph of the PAS molded article produced in Comparative Example 4 after the surface is roughened.

A production method for a layered product according to the invention includes a step of using a molded article obtained by molding a polyarylene sulfide resin composition as a support and roughening the surface of the support by a chemical etching treatment, and a step of performing a metal plating treatment on the roughened surface of the support. The polyarylene sulfide resin composition is obtained by blending a polyarylene sulfide resin (A), a thermoplastic resin (B) other than a polyarylene sulfide resin selected from the group consisting of a thermoplastic elastomer (b1) and a hydrolyzable thermoplastic resin (b2), a carbonate (C), and a polyolefin-based wax (D).

The polyarylene sulfide resin (A) has a resin structure having, as a repeating unit, a structure in which an aromatic ring and a sulfur atom are bonded to each other, and specifically, a resin having, as a repeating unit, a structural moiety represented by the following General Formula (1).

[Chem. 1]

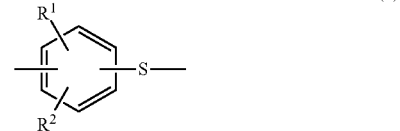

(1)

(In the formula, $R^1$ and $R^2$ each independently represent a hydrogen atom, an alkyl group having 1 to 4 carbon atoms, a nitro group, an amino group, a phenyl group, a methoxy group, or an ethoxy group.)

$R^1$ and $R^2$ in the above General Formula (1) are preferably hydrogen atoms because the mechanical strength of the polyarylene sulfide resin (A) is improved, and in this case, those bonded at a para position represented by the following General Formula (2) and those bonded at a meta position represented by the following General Formula (3) can be mentioned.

[Chem. 2]

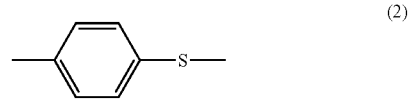

(2)

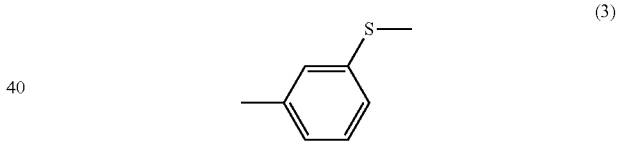

(3)

Among these, it is particularly preferable that the bond of the sulfur atom to the aromatic ring in the repeating unit is a structure bonded at the para position represented by the above General Formula (2) because the heat resistance and the crystallinity of the polyarylene sulfide (A) are improved.

In addition, the polyarylene sulfide resin (A) may have not only the structural moiety represented by the above General Formula (1) but also at least one selected from structural moieties represented by the following General Formulas (4) to (7). When the polyarylene sulfide resin (A) has the structural moieties represented by the following General Formulas (4) to (7), the molar ratio of these structural moieties in the polyarylene sulfide resin (A) is preferably 30 mol % or less, and more preferably 10 mol % or less, because the heat resistance and the mechanical strength are good.

[Chem. 3]

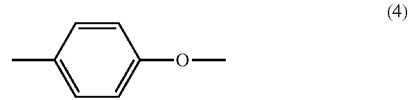

(4)

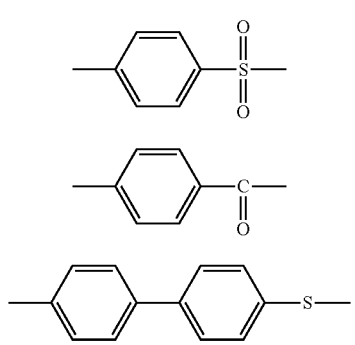

When the polyarylene sulfide resin (A) has the structural moieties represented by the above General Formulas (4) to (7), the bond to the repeating unit of the structural moiety represented by the above General Formula (1) may be a random type or a block type.

Further, the polyarylene sulfide resin (A) may have, in the structure thereof, a trifunctional structural moiety represented by the following General Formula (8), a naphthyl sulfide bond, or the like. It is noted that, in this case, the molar ratio of the structural moiety in the polyarylene sulfide resin (A) is preferably 3 mol % or less, and particularly preferably 1 mol % or less.

[Chem. 4]

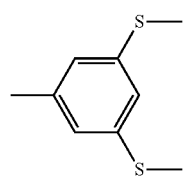

The polyarylene sulfide resin (A) can be produced by, for example, the following methods (1) to (5).

(1) A method of reacting sodium sulfide and p-dichlorobenzene in an amide-based solvent such as N-methylpyrrolidone or dimethylacetamide and a sulfone-based solvent such as sulfolane.

(2) A method of polymerizing p-dichlorobenzene in the presence of sulfur and sodium carbonate.

(3) A method of polymerization by adding dropwise sodium sulfide to a mixed solvent of a polar solvent and p-dichlorobenzene, or adding dropwise a mixture of sodium hydrosulfide and sodium hydroxide, or adding dropwise a mixture of hydrogen sulfide and sodium hydroxide.

(4) A method by self-condensation of p-chlorothiophenol.

(5) A method including reacting a diiodo aromatic compound, an elemental sulfur, and optionally a polymerization inhibitor having a functional group, or reacting the diiodo aromatic compound and the elemental sulfur, or a reaction product thereof, and optionally the polymerization inhibitor in a molten state.

Among these, the method (1) of reacting sodium sulfide and p-dichlorobenzene in an amide-based solvent such as N-methylpyrrolidone or dimethylacetamide and a sulfone-based solvent such as sulfolane is preferred because the reaction control is easy and the industrial productivity is excellent. In addition, in the method (1), an alkali metal salt of a carboxylic acid, an alkali metal salt of a sulfonic acid, or an alkali such as a hydroxide is preferably added in order to adjust the polymerization degree.

The melt viscosity of the PAS resin measured at 300° C. is in the range of preferably 2 Pas or more, more preferably 10 Pas or more, still more preferably 60 Pas or more, and preferably 1000 Pas or less, more preferably 500 Pas or less, still more preferably 200 Pas or less. When the melt viscosity is 2 Pas or more, it is preferable because the material strength can be maintained. On the other hand, when the melt viscosity is 1000 Pas or less, it is preferable from the viewpoint of moldability. It is noted that, in the present description, the value of the "melt viscosity" is a value obtained by measuring the melt viscosity (V6) after holding at 300° C., a load of $1.96 \times 10^6$ Pa, and L/D=10 (mm)/1 (mm) for 6 minutes by using a capillary rheometer (CFT-500D manufactured by Shimadzu Corporation).

Further, the polyarylene sulfide resin (A) can reduce the amount of residual metal ions to improve the moisture resistance characteristics and can reduce the residual amount of low molecular weight impurities that are by-produced during polymerization. Therefore, it is preferable that the polyarylene sulfide (A) is subjected to an acid treatment after being produced, and then washed with water.

Preferred examples of an acid used in the acid treatment include acetic acid, hydrochloric acid, sulfuric acid, phosphoric acid, silicic acid, carbonic acid, and propyl acid.

In addition, among these acids, acetic acid and hydrochloric acid are preferred because the amount of the residual metal ions can be efficiently reduced without decomposing the polyarylene sulfide (A).

Examples of a method of the acid treatment include a method of immersing the polyarylene sulfide resin (A) in an acid or an acid aqueous solution. At this time, stirring or heating may be further performed as needed.

Here, examples of a specific method of the acid treatment include a method taking acetic acid as an example in which, first, an aqueous acetic acid having a pH of 4 is heated to 80° C. to 90° C., the polyarylene sulfide resin (A) is immersed therein, and a mixture thereof is stirred for 20 minutes to 40 minutes.

The polyarylene sulfide resin (A) subjected to the acid treatment in this way is washed several times with water or warm water in order to physically remove the residual acid or salt. Water used at this time is preferably distilled water or deionized water.

In addition, the polyarylene sulfide resin (A) subjected to the acid treatment is preferably a granular material, and more specifically, may be a particulate such as a pellet or may be in a slurry state after the polymerization.

In the invention, since the PAS molded article needs to have an improved adhesive force to the metal layer formed by the metal plating treatment, the PAS resin composition according to the invention is further obtained by blending, as an essential component, a thermoplastic resin (B) other than a polyarylene sulfide resin selected from the group consisting of a thermoplastic elastomer (b1) and a hydrolyzable thermoplastic resin (b2).

The thermoplastic elastomer (b1) used in the invention is not particularly limited as long as it is well known, and is preferably removed by a chemical etching treatment described later. Specific examples thereof include a polyolefin-based thermoplastic elastomer (sometimes also referred to as an "olefin copolymer-based thermoplastic elastomer"), a fluorine-based thermoplastic elastomer, a silicone-based thermoplastic elastomer, a styrene-based thermoplastic elastomer, a fluorine resin-based thermoplastic elastomer, and a urethane resin-based thermoplastic elastomer. In particular, a polyolefin-based thermoplastic elastomer is preferred.

Examples of the polyolefin-based thermoplastic elastomer include a homopolymer of an α-olefin, a copolymer of two or more α-olefins, and a copolymer of one or more α-olefins and a vinyl polymerizable compound having a functional group. At this time, examples of the α-olefin include an α-olefin having 2 or more and 8 or less carbon atoms, such as ethylene, propylene, and 1-butene. In addition, examples of the functional group include a carboxy group, an acid anhydride group (—C(=O)OC(=O)—), an epoxy group, an amino group, a hydroxy group, a mercapto group, an isocyanate group, and an oxazoline group. Examples of the vinyl polymerizable compound having a functional group include one or more of: vinyl acetate; α, β-unsaturated carboxylic acids such as (meth)acrylic acid; alkyl esters of α, β-unsaturated carboxylic acids such as methyl acrylate, ethyl acrylate, and butyl acrylate; metal salts of α, β-unsaturated carboxylic acids such as ionomers (as metals, alkali metals such as sodium, alkaline earth metals such as calcium and zinc); glycidyl esters of α, β-unsaturated carboxylic acids such as glycidyl methacrylateα, β-unsaturated dicarboxylic acids such as maleic acid, fumaric acid, and itaconic acid; and derivatives (monoesters, diesters, and acid anhydrides) of the α, β-unsaturated dicarboxylic acids. In addition, examples thereof include an ethylene-propylene-based rubber (EPM), an ethylene-propylene-diene-based rubber (EPDM), a butadiene-based rubber, a chloroprene-based rubber, a nitrile-based rubber, a butyl-based rubber, and an acrylic rubber. In addition, examples of the styrene-based thermoplastic elastomer include a styrene-butadiene-based rubber (SBR) and hydrogenated SBR. Examples of the thermoplastic elastomer (b1) further include a silicone-based thermoplastic elastomer such as a silicone-based rubber, a fluorine resin-based thermoplastic elastomer such as a fluorine-based rubber, and a urethane resin-based thermoplastic elastomer such as a urethane-based rubber. The above thermoplastic elastomers may be used alone or in combination of two or more thereof.

Here, the hydrolyzable thermoplastic resin (b2) is not particularly limited as long as it is a known hydrolyzable thermoplastic resin, and examples thereof preferably include a hydrolyzable resin by a chemical etching treatment described later. Specific examples thereof include a polyamide resin, a polyester resin, a polycarbonate resin, a polyether resin, a polyurethane resin, a polyketone resin, a polylactone resin, a polyacetal resin, a polyimide resin, a polyamideimide resin, a polyarylate resin, a polyetherimide resin, a polyether ether ketone resin, a thermoplastic epoxy resin, a thermoplastic phenolic resin, and a copolymer containing the above resin structure.

Among the thermoplastic resins (b2), in terms of an excellent adhesive force between the obtained PAS molded article and the metal layer, a polyamide resin and a polycarbonate resin are preferred, and a polyamide resin is more preferred.

Examples of the aromatic polyamide resin include an aromatic polyamide resin containing a repeating unit represented by the following Structural Formula (10).

[Chem. 5]

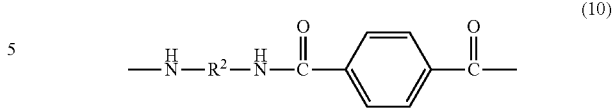

(10)

In the Structural Formula (10), $R^2$ represents an alkylene group having 2 or more and 12 or less carbon atoms. Specifically, such a terephthalic acid amide structure is formed by a reaction between terephthalic acid or terephthalic acid dihalide and an aliphatic diamine having 2 or more and 12 or less carbon atoms. Specific examples of the aliphatic diamine having 2 or more and 12 or less carbon atoms used herein include: linear aliphatic alkylene diamines such as ethylenediamine, propanediamine, 1,4-butanediamine, 1,6-hexanediamine, 1,7-heptanediamine, 1,8-octanediamine, 1,9-nonanediamine, 1,10-decanediamine, 1,11-undecanediamine, and 1,12-dodecanediamine; branched aliphatic alkylene diamines such as 1-butyl-1,2-ethanediamine, 1,1-dimethyl-1,4-butanediamine, 1-ethyl-1,4-butanediamine, 1,2-dimethyl-1,4-butanediamine, 1,3-dimethyl-1,4-butanediamine, 1,4-dimethyl-1,4-butanediamine, 2,3-dimethyl-1,4-butanediamine, 2-methyl-1,5-pentanediamine, 3-methyl-1,5-pentanediamine, 2,5-dimethyl-1,6-hexanediamine, 2,4-dimethyl-1,6-hexanediamine, 3,3-dimethyl-1,6-hexanediamine, 2,2-dimethyl-1,6-hexanediamine, 2,2,4-trimethyl-1,6-hexanediamine, 2,4,4-trimethyl-1,6-hexanediamine, 2,4-diethyl-1,6-hexanediamine, 2,2-dimethyl-1,7-heptanediamine, 2,3-dimethyl-1,7-heptanediamine, 2,4-dimethyl-1,7-heptanediamine, 2,5-dimethyl-1,7-heptanediamine, 2-methyl-1,8-octanediamine, 3-methyl-1,8-octanediamine, 4-methyl-1,8-octanediamine, 1,3-dimethyl-1,8-octanediamine, 1,4-dimethyl-1,8-octanediamine, 2,4-dimethyl-1,8-octanediamine, 3,4-dimethyl-1,8-octanediamine, 4,5-dimethyl-1,8-octanediamine, 2,2-dimethyl-1,8-octanediamine, 3,3-dimethyl-1,8-octandiamine, 4,4-dimethyl-1,8-octanediamine, and 5-methyl-1,9-nonanediamine; and alicyclic diamines such as cyclohexanediamine, methylcyclohexane diamine, isophoronediamine, norbornanedimethylamine, and tricyclodecanedimethylamine.

Among these, in the obtained PAS molded article, in terms of a more excellent adhesive force to the metal layer, a linear aliphatic alkylene diamine having 4 or more and 8 or less carbon atoms and a branched aliphatic alkylene diamine having 5 or more and 10 or less carbon atoms are particularly preferred.

In addition, examples of the aromatic polyamide resin include an aromatic polyamide resin containing a repeating unit represented by the following Structural Formula (11).

[Chem. 6]

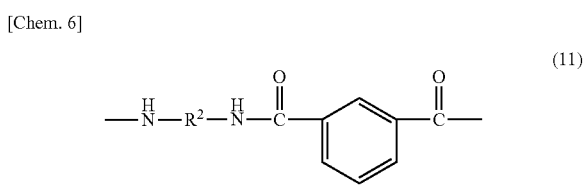

(11)

(In the formula, $R^2$ has the same meaning as $R^2$ in the Structural Formula (10).)

Further, the aromatic polyamide resin may have an acid amide structure represented by the following Structural Formula (12).

[Chem. 7]

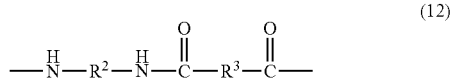

(12)

(In the formula, $R^2$ has the same meaning as $R^2$ in the Structural Formula (10), and $R^3$ represents an aliphatic hydrocarbon group having 4 or more and 10 or less carbon atoms.)

Here, the acid amide structure represented by the above Structural Formula (12) is formed by a reaction between an aliphatic dicarboxylic acid having 4 or more and 10 or less carbon atoms, an acid esterified product thereof, an acid anhydride thereof, or an acid halide thereof, and an aliphatic diamine having 2 or more and 12 or less carbon atoms. Specific examples of the aliphatic dicarboxylic acid having 4 or more and 10 or less carbon atoms used herein include: aliphatic dicarboxylic acids such as malonic acid, dimethylmalonic acid, succinic acid, glutaric acid, adipic acid, 2-methyladipic acid, trimethyladipic acid, pimelic acid, 2,2-dimethylglutaric acid, 3,3-diethylsuccinic acid, azelaic acid, sebacic acid, and suberic acid; and aliphatic dicarboxylic acids such as alicyclic dicarboxylic acids such as 1,3-cyclopentane dicarboxylic acid and 1,4-cyclohexane dicarboxylic acid.

Specific examples of the acid esterified product of the above aliphatic dicarboxylic acid having 4 or more and 10 or less carbon atoms include a methyl ester form, an ethyl ester form, and a t-butyl ester form, and examples of a halogen atom constituting the acid halide of the aliphatic dicarboxylic acid include a bromine atom and a chlorine atom.

As described above, the aromatic polyamide resin preferably has, as structural moieties, the amide structures represented by the Structural Formula (10), the Structural Formula (11), and the Structural Formula (12). However, when an acid amide structure composed of one molecule of a dicarboxylic acid and one molecule of a diamine is defined as one unit, in terms of a more excellent adhesive force to the metal layer in the obtained PAS molded article, it is preferable that the terephthalic acid amide structure is 50 mol % or more, the isophthalic acid amide structure is 10 mol % or more, and the aliphatic hydrocarbon acid amide structure is 5 mol % or more with respect to the total acid amide structure constituting the aromatic polyamide resin (B).

Further, in terms of a more excellent adhesive force to the metal layer in the obtained PAS molded article, the aromatic polyamide resin is preferably a polyamide resin in which the terephthalic acid amide structure represented by the Structural Formula (10) is in the range of 50 mol % or more and 80 mol % or less, the isophthalic acid amide structure represented by the Structural Formula (11) is in the range of 10 mol % or more and 30 mol % or less, and the acid amide structure represented by the Structural Formula (12) is in the range of 5 mol % or more and 20 mol % or less.

In addition, from the viewpoints that the recrystallization peak temperature of the aromatic polyamide resin is lower and the dispersibility with the PAS resin is favorable, it is preferable that the melting point is preferably in the range of 290° C. or higher and 330° C. or lower, and the Tg is in the range of 90° C. or higher and 140° C. or lower.

The aromatic polyamide resin can be produced by, for example, the following methods (1) to (3).

(1) An interfacial polymerization method of dissolving an acid halide of a dicarboxylic acid component containing terephthalic acid and a diamine component containing an aliphatic diamine having 2 or more and 12 or less carbon atoms in two kinds of solvents that are not compatible with each other, and then mixing and stirring the two solutions in the presence of an alkali and a catalytic amount of a quaternary ammonium salt to perform a polycondensation reaction.

(2) A solution polymerization method of reacting an acid halide of a dicarboxylic acid component containing terephthalic acid and a diamine component containing an aliphatic diamine having 2 or more and 12 or less carbon atoms in an organic solvent in the presence of an alkaline compound that accepts an acid such as a tertiary amine.

(3) A melt polymerization method of performing an amide exchange reaction in a molten state using a diester of a dicarboxylic acid component containing terephthalic acid and an aromatic diamine as raw materials.

The blending ratio of the thermoplastic resin (B) is not particularly limited. Since the adhesive force to the metal layer formed by the metal plating treatment is to be further improved, the total amount of the thermoplastic resin (B) other than a PAS resin selected from the group consisting of the thermoplastic elastomer (b1) and the hydrolyzable thermoplastic resin (b2) is preferably 5 parts by mass or more, more preferably 15 parts by mass or more, still more preferably 30 parts by mass or more, and preferably 70 parts by mass or less, more preferably 60 parts by mass or less, and still more preferably 50 parts by mass or less, with respect to 100 parts by mass of the PAS resin (A).

In the invention, since the PAS molded article needs to have an improved adhesive force to the metal layer formed by the metal plating treatment, the PAS resin composition according to the invention is further obtained by blending, as an essential component, a carbonate (C). The carbonate (C) is not particularly limited as long as it is well known, and is preferably removed by a chemical etching treatment described later. Specific examples thereof include calcium carbonate, magnesium carbonate, potassium carbonate, sodium carbonate, sodium hydrogen carbonate, ammonium carbonate, barium carbonate, lithium carbonate, copper (II) carbonate, iron (II) carbonate, silver (I) carbonate, manganese carbonate, zinc carbonate, dolomite, and hydromagnesite, and calcium carbonate is particularly preferred.

The size of the carbonate (C) is not particularly limited. In terms of a more excellent adhesive force to the metal layer in the obtained PAS molded article, the average particle diameter thereof is preferably in the range of 6 μm or less, more preferably 3 μm or less, still more preferably 1.2 μm or less. On the other hand, the lower limit thereof is not limited, and is preferably in the range of 0.3 μm or more, more preferably 0.5 μm or more, and still more preferably 0.8 μm or more. The average particle diameter can be obtained by observing a photograph of a cross section of the obtained molded article by an electron microscope, and can be obtained by, for example, a method of measuring at least any 100 particles in an observation range of 3000 times the size of one side, and obtaining the average value thereof.

The blending ratio of the carbonate (C) is not particularly limited. Since the adhesive force to the metal layer formed by the metal plating treatment is to be further improved, the blending ratio is preferably 10 parts by mass or more, more preferably 25 parts by mass or more, still more preferably 40 parts by mass or more, and preferably 90 parts by mass or less, more preferably 80 parts by mass or less, and still more preferably 70 parts by mass or less, with respect to 100 parts by mass of the PAS resin (A).

In the invention, since the PAS molded article needs to have an improved adhesive force to the metal layer formed by the metal plating treatment, the PAS resin composition according to the invention is further obtained by blending, as an essential component, a polyolefin-based wax (D).

The polyolefin-based wax (also referred to as "polyolefin wax") used in the invention can include a known one as long as it has a polyolefin structure obtained by polymerizing a monomer having an olefin structure. In the invention, the wax refers to a low molecular weight resin that is produced by polymerization and is usually solid at 25° C., and exhibits a release effect in, for example, a mold as an additive to the polyarylene sulfide resin composition during melt-molding. In general, the molecular weight (Mn) thereof is preferably 250 or more, more preferably 300 or more, and preferably 20,000 or less, more preferably 10,000 or less. When the molecular weight is 250 or more, volatilization from a vacuum vent can be prevented during melt-kneading or melt-molding, and the release effect tends to be likely to be exhibited. In addition, during the molding, the wax may be prevented from bleeding out more than necessary to cause mold contamination. On the other hand, when the molecular weight is 20,000 or less, the bleeding-out tends to be less likely to occur, and the release effect tends to be improved.

The olefin-based wax (D) is particularly preferably a polyethylene wax and/or a 1-alkene polymer obtained by polymerizing ethylene and/or 1-alkene as a raw material, since not only a very good release effect can be obtained, but also the obtained PAS molded article has an more excellent adhesive force to the metal layer. As a production method for the polyethylene wax, those widely known in general can be used, and examples thereof include a method of polymerizing ethylene under a high temperature and a high pressure, a method of thermally decomposing polyethylene, and a method of separating and purifying a low molecular weight component from a polyethylene polymer. Examples of the 1-alkene include propylene, 1-butene, 1-pentene, 1-hexene, 1-heptene, 1-octene, 1-nonene, 1-decene, 1-dodecene, 1-tetradecene, 1-hexadecene, 1-heptadecene, 1-octadecene, 1-nonadecene, 1-eicosene, 1-heneicosene, 1-docosene, 1-tricosene, 1-tetracosene, 1-pentacosene, 1-hexcosene, 1-heptacosene, 1-octacosene, and 1-noncosene. As the aliphatic hydrocarbon group constituting the olefin wax (B) used in the invention, both a linear type and a branched type can be used.

The olefin-based wax (D) used in the invention may have a polar group. Examples of the polar group include at least one selected from the group consisting of a carboxyl group, an acid anhydride, an amino group, a hydroxy group, a thiol group, an epoxy group, an ether bond, an ester bond, an amide bond, an imide bond, a urea bond, and a sulfide bond. When the olefin-based wax (D) used in the invention has a polar group, examples thereof include at least one selected from the group consisting of a carboxyl group, an acid anhydride, an amino group, a hydroxy group, a thiol group, an epoxy group, an ether bond, an ester bond, an amide bond, an imide bond, a urea bond, and a sulfide bond, which can be copolymerized with a monomer used in polymerization or copolymerization of the ethylene and/or the 1-alkene, and a compound having an ethylenic double bond, preferably those obtained by copolymerizing maleic anhydride or maleic anhydride and maleic acid.

The blending ratio of the olefin-based wax (D) is not particularly limited. Since the adhesive force to the metal layer formed by the metal plating treatment is to be further improved, the blending ratio is preferably 0.01 parts by mass or more, more preferably 0.05 parts by mass or more, still more preferably 0.1 parts by mass or more, and preferably 10 parts by mass or less, more preferably 5 parts by mass or less, and still more preferably 2 parts by mass or less, with respect to 100 parts by mass of the PAS resin (A).

The PAS resin composition according to the invention can be further obtained by blending, as an optional component, a filler other than the carbonate (C). As such a filler, a commonly used material can be used as long as effects of the invention are not impaired, and examples thereof include fillers having various shapes such as granular and fibrous shapes. Specifically, fibrous fillers such as a glass fiber, a carbon fiber, a silane glass fiber, a ceramic fiber, an aramid fiber, a metal fiber, potassium titanate, silicon carbide, calcium sulfate, and calcium silicate, or a natural fiber such as wollastonite can be used. In addition, barium sulfate, calcium sulfate, clay, pyrophyllite, bentonite, sericite, zeolite, mica, talc, attapulgite, ferrite, calcium silicate, glass beads, and the like can be used. The filler used in the invention is not an essential component, but when used, the blending ratio thereof is not particularly limited as long as the effects of the invention are not impaired, and varies depending on the respective purposes, and cannot be roughly specified. For example, the filler is blended in the range of preferably 10 parts by mass or more, more preferably 40 parts by mass or more, and preferably 90 parts by mass or less, more preferably 70 parts by mass or less, with respect to 100 parts by mass of the polyarylene sulfide resin. Within this range, various performances such as strength, rigidity, heat resistance, heat dissipation, and dimensional stability can be improved according to the purpose of the filler to be added.

As the filler, a filler processed with a surface treatment agent or a sizing agent can be used. This is preferred because the adhesive force to the PAS resin (A) can be improved. Examples of the surface treatment agent or the sizing agent include at least one polymer selected from the group consisting of a silane compound, a titanate compound, an acrylic resin, a urethane resin, and an epoxy resin having a functional group such as an amino group, an epoxy group, an isocyanate group, and a vinyl group.

Further, as a component other than the thermoplastic resin (B) and the olefin-based wax (D), the polyarylene sulfide resin composition according to the invention can be blended by a synthetic resin as an optional component according to the intended use, for example, synthetic resins such as an epoxy resin, a polyimide resin, a polyetherimide resin, a polyphenylene ether resin, a polysulfone resin, a polyethersulfone resin, a polyether ether ketone resin, a polyether ketone resin, a polyarylene resin, a polyethylene resin, a polypropylene resin, a polytetrafluorinated ethylene resin, a polydifluorinated ethylene resin, a polystyrene resin, an ABS resin, a phenol resin, a urethane resin, or a liquid crystal polymer (hereinafter, simply referred to as a synthetic resin). In the invention, the synthetic resin is not an essential component, but when blended, the blending ratio thereof is not particularly limited as long as the effects of the invention are not impaired, and varies depending on the respective purposes, and cannot be roughly specified. Examples of the ratio of the synthetic resin to be blended in the resin composition according to the invention include a range of 5 parts by mass or more and 15 parts by mass or less with respect to 100 parts by mass of the PAS resin (A). In other words, the ratio of the PAS resin (A) to the total of the PAS resin (A) and the synthetic resin is preferably in the range of (100/115) or more, and preferably in the range of (100/105) or less, on the basis of mass.

In addition, the PAS resin composition according to the invention may be blended by a commonly used additive such as a colorant, an antistatic agent, an antioxidant, a heat stabilizer, an ultraviolet stabilizer, an ultraviolet absorber, a foaming agent, a flame retardant, a flame retardant aid, a rust inhibitor, and a coupling agent as an optional component as needed. These additives are not essential components, but when blended, the blending ratio thereof is not particularly limited as long as the effects of the invention are not impaired, and varies depending on the respective purposes, and cannot be roughly specified. The blending ratio may be appropriately adjusted and used preferably in the range of 0.01 parts by mass or more and 1,000 parts by mass or less with respect to 100 parts by mass of the PAS resin (A) according to the purposes and uses so as not to impair the effects of the invention.

The PAS resin composition according to the invention is obtained by blending the polyarylene sulfide resin (A), the thermoplastic resin (B), the carbonate (C), and the polyolefin-based wax (D) as essential components, and blending the optional components as needed. The production method for the PAS resin composition includes a step of blending the polyarylene sulfide resin (A), the thermoplastic resin (B), the carbonate (C), and the polyolefin-based wax (D) as essential components, blending the optional components as needed, and melt-kneading the mixture at a temperature equal to or higher than the melting point of the PAS resin.

In a preferred production method for the PAS resin composition according to the invention, the PAS resin composition can be produced by a step of charging the essential components and the optional components into a ribbon blender, a Henschel mixer, a V blender, or the like in various forms such as powders, pellets, and small pieces, dry blending the essential components and the optional components, then charging the mixture into a known melt-kneader such as a Banbury mixer, a mixing roll, a single-screw or twin-screw extruder, or a kneader, and melt-kneading the mixture in a temperature range in which the resin temperature is equal to or higher than the melting point of the PAS resin, preferably in a temperature range in which the resin temperature is the melting point+10° C. or higher, more preferably in a temperature range in which the resin temperature is the melting point+20° C. or higher, and in a temperature range in which the resin temperature is the melting point+100° C. or lower, more preferably in a temperature range in which the resin temperature is the melting point+50° C. or lower. Addition and mixing of the components to the melt-kneader may be performed at the same time or may be performed separately.

The melt-kneader is preferably a twin-screw kneading extruder from the viewpoints of the dispersibility and the productivity, and for example, it is preferable to perform melt-kneading while appropriately making an adjustment in a range of the discharge amount of the resin component of 5 to 500 (kg/hr) and a range of the screw rotational speed of 50 to 500 (rpm), and it is more preferable to perform melt-kneading under a condition that the ratio (discharge amount/screw rotational speed) falls within a range of 0.02 to 5 (kg/hr/rpm). In addition, when a filler or an additive among the components is added, it is preferable to charge the filler or the additive into the extruder from a side feeder of the twin-screw kneading extruder from the viewpoint of dispersibility. Regarding the position of the side feeder, the ratio of the distance from a resin charging portion (top feeder) to the side feeder of the extruder with respect to a total length of the screw of the twin-screw kneading extruder is preferably 0.1 or more, and more preferably 0.3 or more. In addition, such a ratio is preferably 0.9 or less, and more preferably 0.7 or less.

The PAS resin composition according to the invention obtained by melt-kneading in this manner is a molten mixture containing the essential components, the optional components added as needed, and derived components thereof. After the melt-kneading, a known method is preferred, for example, a method of extruding a PAS resin composition in a molten state into a strand form, then processing the strand into a form such as pellets, chips, granules, and powders, and then preliminary drying the obtained product in a temperature range of 100° C. to 150° C. as needed for various types of molding. When extruding into the strand form, there may be a step of melting the resin composition according to the invention in preferably a shear region having a shear rate of 500 $\text{sec}^{-1}$ or less, and more preferably a shear region having a shear rate of 100 $\text{sec}^{-1}$ or less and 0 $\text{sec}^{-1}$ or more.

The PAS resin composition according to the invention produced by the above production method can contain the thermoplastic resin (B), the carbonate (C), and the polyolefin-based wax (D) in addition to the PAS resin (A). It is considered that the PAS resin composition has a morphology in which at least dispersed phases of the thermoplastic resin (B) and the carbonate (C) are formed in a continuous phase of the PAS resin. Further, it is considered that by using the polyolefin-based wax (D), an effect of extruding the thermoplastic resin (B) and the carbonate (C) to the surface of the molded article is increased, and as a result, in a roughening step, the thermoplastic resin (B) and the carbonate formed on the roughened surface of the PAS molded article are removed, a void formed is likely to be filled with a metal constituting the metal layer formed by the metal plating treatment, and the adhesive force to the metal layer is further improved.

The PAS molded article according to the invention is obtained by, for example, melt-molding the PAS resin composition. A production method for the PAS molded article according to the invention includes a step of melt-molding the PAS resin composition. In addition, the production method for the PAS molded article according to the invention may include a step of melting the PAS resin composition in preferably a shear region having a shear rate of 500 $\text{sec}^{-1}$ or less, and more preferably a shear region having a shear rate of 100 $\text{sec}^{-1}$ or less and 0 $\text{sec}^{-1}$ or more. The melt-molding may be performed by using a known method, for example, various molding methods such as injection molding, compression molding, extrusion molding of composites, sheets, and pipes, drawing molding, blow molding, and transfer molding can be applied. When molding by injection molding, various molding conditions are not particularly limited, and the molding can be performed by a general method. For example, in an injection molding machine, after a step of melting the PAS resin composition in a temperature range in which the resin temperature is equal to or higher than the melting point of the PAS resin, preferably a temperature range in which the resin temperature is the melting point+10° C. or higher, more preferably a temperature range in which the resin temperature is the melting point+20° C. or higher, and a temperature range in which the resin temperature is the melting point+100° C. or lower, more preferably a temperature range in which the resin temperature is the melting point+50° C. or lower, the PAS resin composition may be injected into a mold from a resin discharge port and molded. At this time, the range of the mold temperature is also preferably a known temperature range, for example, a room temperature (23° C.) or higher, more preferably 40° C. or higher, and still more preferably 120° C. or higher. Further, the mold temperature is preferably 300° C. or lower, more preferably 200° C. or lower, and still more preferably 180° C. or lower.

The shape of the PAS molded article according to the invention is not particularly limited. When the PAS molded article forms a conductive pattern to be used for electronic circuit applications as described later, for example, a plate shape, a film shape, or a sheet shape can be used. In the case of a plate shape, a support shape having a thickness of preferably 0.5 mm or more, more preferably 1.0 mm or more, and preferably 100 mm or less, more preferably 10 mm or less is preferred. In the case of a film shape or a sheet shape, the thickness is preferably 1 μm or more, preferably 5,000 μm or less, more preferably 300 μm or less, and still more preferably 200 μm or less. In addition, the PAS molded article may have a three-dimensional shape formed by a mold such as a connector or a flexible tube.

The PAS molded article thus obtained can be used for a layered product and a production method therefor according to the invention as described later.

The layered product according to the invention is a layered product in which a metal layer is layered on a roughened surface of a molded article obtained by molding a polyarylene sulfide resin composition. The polyarylene sulfide resin composition is obtained by blending a polyarylene sulfide resin (A), a thermoplastic resin (B) other than a polyarylene sulfide resin selected from the group consisting of a thermoplastic elastomer (b1) and a hydrolyzable thermoplastic resin (b2), a carbonate (C), and an olefin-based wax (D).

The layered product according to the invention is produced by a production method including a step of roughening, by a chemical etching treatment, the surface of the molded article obtained by molding the PAS resin composition (hereinafter, sometimes simply referred to as a "roughening step"), and a step of performing a metal plating treatment on the roughened surface of the molded article (hereinafter, sometimes simply referred to as a "metal plating step").

The roughening step includes a step of bringing an etching solution into contact with the surface of the PAS molded article by, for example, applying the etching solution by an immersion method.

The etching solution is not particularly limited as long as it can remove the thermoplastic resin (B) and the carbonate present on the surface of the PAS molded article, and preferably contains, for example, a strong acid or a salt thereof. Examples of such a strong acid or a salt thereof include chromic acid, sulfuric acid, ammonium fluoride, nitric acid, and chromic anhydride, and one of these or a combination of two or more thereof can be used. Regarding the condition for bringing the etching solution into contact with the surface of the PAS molded article, it is preferable that the contact is performed while appropriately adjusting the concentration of the strong acid or the salt thereof in the etching solution, and the temperature and the time during the contact.

A known etching solution can be used. For example, an etching solution made of 400 g/l of sulfuric acid, 400 g/l of chromic anhydride, and diluted water (an amount of 1 l in total etching solution) described in JP-A-H05-155127 can be used.

In the roughening step, at least a part of the thermoplastic resin (B) and the carbonate (C) uniformly dispersed on the surface of the PAS molded article is removed to form a void. The presence of the void or an increase in specific surface area thereof further improves an interaction with metal particles constituting the metal layer, and the adhesive force between the PAS molded article and the metal layer is improved. In addition, in the related art, when a coating film is formed with an adhesive or the like in a vertical direction of the surface of the molded article and is to be adhered to the metal layer, since the unsolidified adhesive or the like tends to hang down due to the influence of the own weight during production and an unevenness in film thickness tends to occur, the adhesive force tends to be uneven. However, in the invention, the unevenness of the void due to a place on the surface of the molded article tends to be less likely to occur, and therefore, the uniformity of the adhesive force is also excellent. The surface roughness of the roughened surface of the PAS molded article is not particularly limited, and in terms of an excellent adhesive force, the ten-point average roughness Rz is preferably 0.1 μm or more, more preferably 1 μm or more, and preferably 10 μm or less, more preferably 5 μm or less.

The metal plating step includes a step of forming the roughened surface of the PAS molded article by an electrolytic plating method, an electroless plating method, or a combination thereof.

In a wet plating method such as the electrolytic plating method or the electroless plating method, it is preferable that the void formed by removing the thermoplastic resin (B) and the carbonate and formed on the roughened surface of the PAS molded article is likely to be filled with the metal constituting the metal layer formed by the metal plating treatment, the adhesive force to the metal layer is further improved, and a conductive pattern excellent in conductivity can be obtained.

In the electroless plating method, for example, by bringing an electroless plating solution into contact with the roughened surface of the PAS molded article, a metal such as copper contained in the electroless plating solution can be deposited to form an electroless plating layer (film) made of a metal film.

Examples of the electroless plating solution include those containing at least one metal selected from the group consisting of nickel, copper, chromium, zinc, gold, silver, aluminum, iron, tin, cobalt, tungsten, palladium, lead, platinum, cadmium, and rhodium (these metals are also referred to as "metals in the metal plating", "metals constituting the metal layer"), a reducing agent, and a solvent such as an aqueous medium or an organic solvent.

Examples of the reducing agent include dimethylaminoborane, hypophosphorous acid, sodium hypophosphite, dimethylamine borane, hydrazine, formaldehyde, sodium borohydride, and phenol.

In addition, as the electroless plating solution, if necessary, those containing organic acids such as monocarboxylic acids such as acetic acid and formic acid, dicarboxylic acid compounds such as malonic acid, succinic acid, adipic acid, maleic acid, and fumaric acid, hydroxycarboxylic acid compounds such as malic acid, lactic acid, glycolic acid, gluconic acid, and citric acid, amino acid compounds such as glycine, alanine, iminodiacetic acid, arginine, aspartic acid, and glutamic acid, aminopolycarboxylic acid compounds such as iminodiacetic acid, nitrilotriacetic acid, ethylenediaminediacetic acid, ethylenediaminetetraacetic acid, and diethylenetriaminepentaacetic acid, or soluble salts of these organic acids (a sodium salt, a potassium salt, an ammonium salt, etc.), and complexing agents such as amine compounds such as ethylenediamine, diethylenetriamine, and triethylenetetramine can be used.

The electroless plating solution is preferably used in the range of 20° C. to 98° C.

The electrolytic plating method is, for example, a method of forming an electrolytic plating layer (metal film) by depositing, on the surface of the electroless plating layer (film) formed by the electroless treatment and installed on a cathode, a metal such as copper contained in the electrolytic plating solution, by energizing the surface of the electroless plating layer (film) formed by the electroless plating treatment in a state where the electrolytic plating solution is in contact with the surface.

Examples of the electrolytic plating solution include those containing a sulfide of a metal such as nickel, copper, chromium, zinc, gold, silver, aluminum, iron, tin, cobalt, palladium, lead, platinum, cadmium, tungsten, and rhodium (these metals are also referred to as "metals in the metal plating", "metals constituting the metal layer"), sulfuric acid, and an aqueous medium. Specific examples thereof include those containing copper sulfate, sulfuric acid, and an aqueous medium.

The electrolytic plating solution is preferably used in the range of 20° C. to 98° C.

The film thickness of the metal layer formed by the metal plating treatment is not particularly limited, and is, for example, preferably 0.1 μm or more, and preferably 500 μm or less. The film thickness of the metal layer formed by the metal plating treatment can be adjusted according to the treatment time, the current density, the amount of a plating additive used, and the like in the metal plating step.

In the layered product according to the invention produced by the above production method, the metal film is formed by the metal plating treatment on the roughened surface of the PAS molded article, that is, in the void formed by removing the thermoplastic resin (B) and the carbonate (C), and the metal film adheres to the PAS molded article with a high adhesive force. Therefore, the layered product according to the invention can be applied to various members in the electric/electronic field such as an electronic circuit, a wiring connector, an optical connector for an optical cable, an optical pickup such as Blu-ray or a DVD, an electromagnetic wave shield, a flexible printed circuit board, an RFID such as a non-contact IC card, and a film capacitor. In addition, the layered product according to the invention can be applied to a bearing member, a sliding member, a lamp reflector, an electrical member, an electromagnetic wave shielding member, an electric motor peripheral member, a battery member, a heat exchanger member, a pressure roller such as a laser printer, and a water area (water pipe) in the mechanical field including automobiles. Further, since the roughened surface of the PAS molded article is less likely to have an unevenness in void due to a place and the uniformity of the adhesive force is excellent, the layered product according to the invention is also preferably applied to a PAS molded article having a complicated shape, such as a layered product in which a metal layer is layered on a PAS molded article having a three-dimensional shape.

EXAMPLES

Hereinafter, the invention will be described in detail with reference to Examples, but the invention is not limited to the following Examples. Unless otherwise specified, parts and % are on the basis of mass.

Measurement of Melt Viscosity of PPS Resin

The melt viscosity of a PPS resin produced in the following Production Example was measured after holding at 300° C., a load of $1.96 \times 10^6$ Pa, L/D=10 (mm)/1 (mm) for 6 minutes by using a capillary rheometer (CFT-500D manufactured by Shimadzu Corporation).

Examples 1 to 12 and Comparative Examples 1 to 8

Producing Step for PAS Molded Article

According to the composition components and blending amounts (all parts by mass) shown in Tables 1 to 5, materials other than glass fibers were uniformly mixed by a tumbler. Then, the blended materials were charged into a charging port (top feeder) of a twin-screw extruder with a vent (TEX30α manufactured by The Japan Steel Works, LTD.), the glass fibers were charged from a side feeder. The mixture was melt-kneaded when the resin component discharge amount was set to 30 kg/hr, the screw rotation speed was set to 220 rpm, and the set resin temperature was set to 320° C., and a strand material discharged from the discharge port was cut to obtain pellets.

Figure 5:
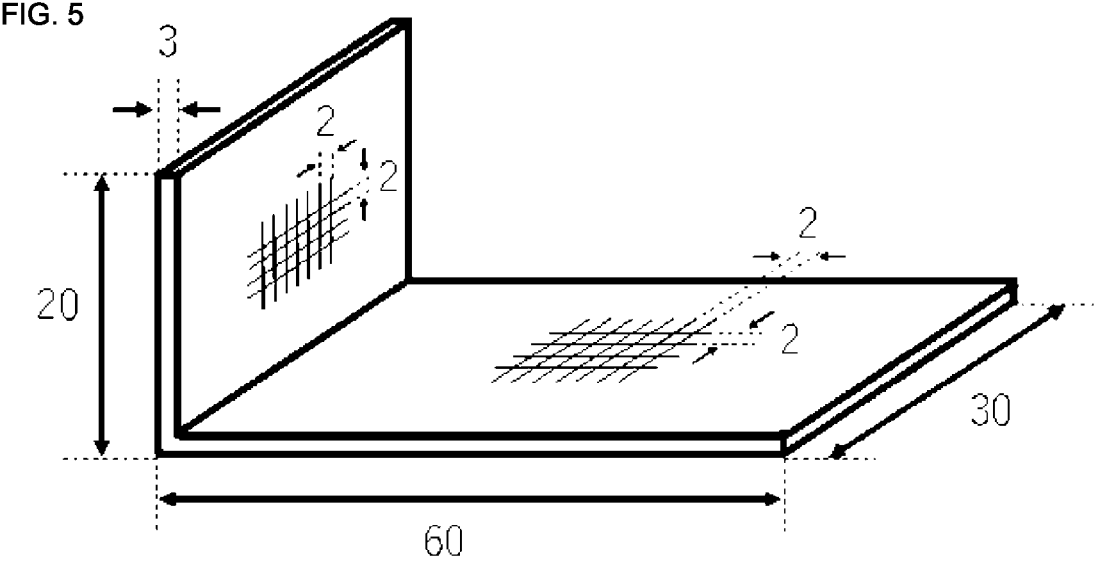
FIG. 5 is a conceptual diagram of a molded article (the unit of dimensions is mm) used for a plating adhesion test.

Subsequently, the pellets were supplied to an injection molding machine (SE75D-HP) manufactured by Sumitomo Heavy Industries, Ltd. whose cylinder temperature was set to 310° C., and injection molding was performed by using an L-shaped mold illustrated in FIG. 5 in which the mold temperature was adjusted to 140° C. to obtain an L-shaped molded article.

Roughening Step for PAS Molded Article

The molded article obtained above was immersed in a chemical etching treatment solution for 3 minutes to 20 minutes, and then withdrawn to form a roughened surface on the molded article.

Metal Plating Step for PAS Molded Article

Next, electroless copper plating was applied to the above-obtained roughened surface of the PAS molded article, on which the roughened surface was formed, by the following method. The roughened surface was immersed in an electroless copper plating solution (OIC copper, manufactured by Okuno Chemical Industries Co., Ltd., pH: 12.5) at 55° C. for 20 minutes to form an electroless copper plating film (thickness: 0.5 μm).

Next, the surface of the electroless copper plating obtained above was installed on a cathode, phosphorus-containing copper was installed on an anode, and electroplating was performed at a current density of 2.5 A/dm² for 30 minutes by using an electroplating solution containing copper sulfate to layer a copper plating layer having a thickness of 15 μm on the surface of the electroless copper plating film. As the electroplating solution, 70 g/l of copper sulfate, 200 g/l of sulfuric acid, 50 mg/l of chlorine ion, and 5 g/l of Top Lucina SF (brightener manufactured by Okuno Chemical Industries Co., Ltd.) were used.

With the above method, a layered product in which the metal layer was formed on the roughened surface of the PAS molded article by the metal plating treatment was obtained.

Measurement Example

<Measurement of Plating Adhesion (Adhesiveness)>

A cross-cut test was performed by using an adhesive tape specified in JIS Z1522 (adhesive strength: about 8 N per 25 mm width, nominal width: 12 mm to 19 mm, Cellotape (registered trademark) No. 405 manufactured by Nichiban Co., Ltd.). That is, the procedure was as follows. First, on the plated surface of each of an inner bottom surface and an inner side surface formed by using a sharp blade with streaks extending to a base material such that a square with each side of 2 mm can accommodate 3×6=18 masses, the center of the tape was placed on the mass, and the tape is attached by using the finger so as to be flat, while leaving a portion not attached to the base material at the tape end by 30 mm to 50 mm. At this time, while attention was paid such that air bubbles cannot be generated, the tape was continuously pressed for about 10 seconds at 20 N/cm².

Within one minute, the unattached portion at the tape end was held and the tape was peeled off at a speed of 200 cm/sec at an angle of 90° with respect to the plated surface. The 18 masses on the inner bottom surface and 18 masses on the inner side surface were evaluated. In the tables, "0/18" means that the number of peeled masses is 0, and "18/18" means that the number of peeled masses is 18. Among 18 masses, the smaller the number of the peeled surface, the greater the adhesive force.

The compositions of the polyphenylene sulfide resin compositions used in Examples 1 to 12 and Comparative Examples 1 to 5 and evaluation results of the adhesion test of the metal layers forming the layered products are shown in Tables 1 to 4.

TABLE 1

|  | Example 1 | Example 2 | Example 3 | Example 4 | Example 5 |
|---|---|---|---|---|---|
| Raw material composition |  |  |  |  |  |
| A | 100.0 | 100.0 | 100.0 | 100.0 | 100.0 |
| B1-1 | 22.1 | 22.1 | 7.8 | 22.1 | 8.3 |
| B1-2 | 9.5 | 9.5 | 3.3 | 9.5 | 3.6 |
| B2-1 |  |  |  |  |  |
| B2-2 |  |  |  |  |  |
| C-1 | 78.9 | 65.8 | 55.6 |  | 59.5 |
| C-2 |  |  |  | 65.8 |  |
| C-3 |  |  |  |  |  |
| D-1 | 0.5 | 0.5 | 0.4 | 0.5 |  |
| D-2 |  |  |  |  | 0.5 |
| d-3 |  |  |  |  |  |
| d-4 |  |  |  |  |  |
| E | 47.4 | 69.5 | 51.1 | 60.5 | 54.8 |
| Others |  |  |  |  |  |
| Chemical etching treatment | F-1 | F-1 | F-1 | F-1 | F-1 |
| Measurement result |  |  |  |  |  |
| Plating bulge | No | No | No | Yes | Yes |
| Tape peel test  Bottom surface | 0/18*[1] | 0/18 | 0/18 | 8/18 | 1/18 |
| Tape peel test  Side surface | 0/18 | 0/18 | 1/18 | 7/18 | 0/18 |

*[1] the number of peeled mass/18 masses

TABLE 2

|  | Example 6 | Example 7 | Example 8 | Example 9 | Example 10 |
|---|---|---|---|---|---|
| Raw material composition |  |  |  |  |  |
| A | 100 | 100.0 | 100.0 | 100.0 | 100.0 |
| B1-1 | 18.6 | 15.1 | 12.5 | 11.5 | 11.5 |
| B1-2 | 8.0 | 6.5 | 5.3 | 4.9 | 4.9 |
| B2-1 | 6.5 | 13.4 | 30.6 | 20.2 |  |
| B2-2 |  |  |  |  | 20.2 |
| C-1 | 66.6 | 67.5 | 68.2 | 68.3 | 68.3 |
| C-2 |  |  |  |  |  |
| C-3 |  |  |  |  |  |
| D-1 | 0.5 | 0.5 | 0.6 | 0.5 | 0.5 |
| D-2 |  |  |  |  |  |
| d-3 |  |  |  |  |  |
| d-4 |  |  |  |  |  |
| E | 61.3 | 62.1 | 68.2 | 62.8 | 62.8 |
| Others |  |  |  |  |  |
| Chemical etching treatment | F-1 | F-1 | F-1 | F-1 | F-1 |
| Measurement result |  |  |  |  |  |
| Plating bulge | No | No | No | No | No |
| Tape peel test  Bottom surface | 1/18 | 0/18 | 0/18 | 1/18 | 0/18 |
| Tape peel test  Side surface | 1/18 | 0/18 | 1/18 | 1/18 | 1/18 |

TABLE 3

|  | Example 11 | Example 12 |
|---|---|---|
| Raw material composition |  |  |
| A | 100.0 | 100.0 |
| B1-1 | 11.5 | 11.5 |

TABLE 3-continued

|  | Example 11 | Example 12 |
| --- | --- | --- |
| B1-2 | 4.9 | 4.9 |
| B2-1 | 20.2 | 20.2 |
| B2-2 |  |  |
| C-1 |  | 68.3 |
| C-2 |  |  |
| C-3 | 68.3 |  |
| D-1 | 0.5 | 0.5 |
| D-2 |  |  |
| d-3 |  |  |
| d-4 |  |  |
| E | 62.8 | 62.8 |
| Others |  |  |
| Chemical etching treatment | F-1 | F-2 |
| Measurement result |  |  |
| Plating bulge | No | No |
| Tape peel test  Bottom surface | 4/18 | 1/18 |
| Tape peel test  Side surface | 5/18 | 1/18 |

TABLE 4

|  | Comparative Example 1 | Comparative Example 2 | Comparative Example 3 | Comparative Example 4 | Comparative Example 5 |
| --- | --- | --- | --- | --- | --- |
| Raw material composition |  |  |  |  |  |
| A | 100.0 | 100.0 | 100.0 | 100.0 | 100.0 |
| B1-1 | 22.1 | 22.1 | 22.1 | 8.3 | 8.3 |
| B1-2 | 9.5 | 9.5 | 9.5 | 3.6 | 3.6 |
| B2-1 |  |  |  |  |  |
| B2-2 |  |  |  |  |  |
| C-1 | 78.9 | 78.9 |  |  | 59.5 |
| C-2 |  |  | 65.8 | 59.5 |  |
| C-3 |  |  |  |  |  |
| D-1 |  |  |  |  |  |
| D-2 |  |  |  |  |  |
| d-3 | 0.5 |  | 0.5 | 0.5 | 0.5 |
| d-4 |  | 0.5 |  |  |  |
| E | 47.4 | 47.4 | 60.5 | 54.8 | 54.8 |
| Others |  |  |  |  |  |
| Chemical etching treatment | F-1 | F-1 | F-1 | F-1 | F-1 |
| Measurement result |  |  |  |  |  |
| Plating bulge | No | No | No | No | Yes |
| Tape peel test  Bottom surface | 15/18 | 18/18 | 17/18 | 17/18 | 16/18 |
| Tape peel test  Side surface | 14/18 | 16/18 | 17/18 | 17/18 | 17/18 |

Raw Materials Used

The components used as raw materials of the polyarylene sulfide resin composition and the chemical etching treatment solutions are shown below.

PAS Resin (A) Linear polyphenylene sulfide (MFR by ASTM D 1238-86: 600 g/10 minutes)

Thermoplastic Resin Other than PAS Resin (B1-1) Olefin-based polymer "BONDFAST 7L" (ethylene-maleic anhydride-glycidyl methacrylate copolymer), manufactured by Sumitomo Chemical Co., Ltd.

(B1-2) Olefin-based polymer "Engage 8842" (ethylene-α-olefin copolymer), manufactured by Dow Chemical Company (B2-1) Polyamide resin "AMODEL A-1004", manufactured by Amodel Specialty Polymers Co., Ltd.

(B2-2) Polycarbonate resin "Iupilon-Iupilon MB4304R", manufactured by Mitsubishi Chemical Corporation Carbonate (C-1) Calcium carbonate "Calcium carbonate NS #2300" (average particle diameter[*3]: 1.0 μm), manufactured by Nitto Funka Kogyo Co., Ltd.

(C-2) Calcium carbonate "Primary calcium carbonate" (average particle diameter[*3]: 6.4 μm), manufactured by Sankyo Flour Milling Co., Ltd.

(C-3) Magnesium carbonate (synthetic magnesite) "MAGTHERMO MS-S" (average particle diameter[*3]: 1.2 μm), manufactured by KONOSHIMA Co., Ltd.

The average particle diameter is the average particle diameter of the powder calculated according to a calculation formula (average particle diameter=6/(specific gravity×specific surface area)×10000 [μm]) by using a specific surface area value per 1 g of the powder according to a powder specific surface area measuring apparatus SS-100 type manufactured by Shimadzu Corporation.

Wax (D-1) High density polyethylene wax "Luwax AH-6" manufactured by BASF (D-2) Maleic anhydride polyethylene "Licolub CE-2" manufactured by Clariant Japan K.K.

(d-3) Pentaerythritol fatty acid ester "Loxiol VPG-861" manufactured by Green Polymer Additive Co., Ltd.

(d-4) Montanic acid ester wax "Licolub WE-40" manufactured by Clariant Japan K.K.

Others (E-1) Glass fiber "T-717H" (fiber length: 3 mm, average diameter: 10 μm) manufactured by Nippon Electric Glass Co., Ltd.

Chemical Etching Treatment

F-1: 400 g of chromic anhydride was dissolved in 200 ml of 96% concentrated sulfuric acid, further diluted with water, and the total amount was 1 liter.

F-2: 100 g of ammonium fluoride was dissolved in 600 ml of a 67% nitric acid aqueous solution, diluted water was further added, and the total amount was 1 liter.

The invention claimed is:

1. A layered product in which a metal layer is layered on a roughened surface of a molded article obtained by molding a polyarylene sulfide resin composition, wherein:
the polyarylene sulfide resin composition is obtained by blending a polyarylene sulfide resin (A), a thermoplastic resin (B) other than a polyarylene sulfide resin selected from the group consisting of a thermoplastic elastomer (b1) and a hydrolyzable thermoplastic resin (b2), a carbonate (C), and a polyolefin-based wax (D);

the carbonate (C) is a particulate substance having an average particle diameter of 0.3 μm or more and 1.2 μm or less;

the thermoplastic elastomer (b1) is at least one selected from the group consisting of a polyolefin-based thermoplastic elastomer, a fluorine-based thermoplastic elastomer, a silicone-based thermoplastic elastomer, a styrene-based thermoplastic elastomer, a fluorine resin-based thermoplastic elastomer, and a urethane resin-based thermoplastic elastomer;

the hydrolyzable thermoplastic resin (b2) is at least one resin having a resin structure selected from the group consisting of a polyamide resin, a polyester resin, a polycarbonate resin, a polyether resin, a polyurethane resin, a polyketone resin, a polylactone resin, a polyacetal resin, a polyimide resin, a polyamideimide resin, a polyarylate resin, a polyetherimide resin, a polyether ether ketone resin, a thermoplastic epoxy resin, and a thermoplastic phenolic resin, or a copolymer having said resin structure; and the roughened surface of the molded article is roughened by chemical etching treatment.

2. The layered product according to claim 1, wherein the carbonate (C) is at least one selected from the group consisting of calcium carbonate, magnesium carbonate, potassium carbonate, sodium carbonate, sodium hydrogen carbonate, ammonium carbonate, barium carbonate, lithium carbonate, copper (II) carbonate, iron (II) carbonate, silver (I) carbonate, manganese carbonate, zinc carbonate, dolomite, and hydromagnesite.

3. The layered product according to claim 1, wherein the polyarylene sulfide resin composition further comprises a fibrous filler.

4. The layered product according to claim 1, wherein a metal constituting the metal layer is at least one selected from the group consisting of nickel, copper, chromium, zinc, iron, gold, silver, aluminum, tin, cobalt, palladium, lead, platinum, cadmium, and rhodium.

* * * * *